United States Patent
Szeto et al.

(10) Patent No.: US 10,628,964 B2
(45) Date of Patent: Apr. 21, 2020

(54) METHODS AND DEVICES FOR EXTENDED REALITY DEVICE TRAINING DATA CREATION

(71) Applicant: SEIKO EPSON CORPORATION, Tokyo (JP)

(72) Inventors: Hiu Lok Szeto, Richmond Hill (CA); Syed Alimul Huda, Scarborough (CA); Kiever Xiang Chen, Toronto (CA)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/135,800

(22) Filed: Sep. 19, 2018

(65) Prior Publication Data

US 2020/0090368 A1 Mar. 19, 2020

(51) Int. Cl.
  *G06T 7/73* (2017.01)
  *G06T 19/00* (2011.01)
  *G06T 7/33* (2017.01)
  *G02B 27/01* (2006.01)
  *G06F 3/01* (2006.01)

(52) U.S. Cl.
  CPC ............ *G06T 7/74* (2017.01); *G02B 27/017* (2013.01); *G06F 3/011* (2013.01); *G06T 7/337* (2017.01); *G06T 19/006* (2013.01)

(58) Field of Classification Search
  None
  See application file for complete search history.

(56) References Cited

U.S. PATENT DOCUMENTS

2014/0168268 A1* 6/2014 Oi .................. G06T 19/006 345/633
2014/0313228 A1* 10/2014 Kasahara .......... G06T 19/006 345/633

OTHER PUBLICATIONS

Collier et al.; "Autonomous Navigation and Mapping in GPS-Denied Environments at Defence R&D Canada."; "NATO Unclassified"; pp. 1-12; Jan. 2012.

* cited by examiner

*Primary Examiner* — Vu Nguyen
(74) *Attorney, Agent, or Firm* — Oliff PLC

(57) ABSTRACT

A method includes acquiring, from the camera, a camera data sequence including a first image frame of a real object in a scene, tracking a pose of the real object with respect to the camera along the camera data sequence, and displaying an XR object on the display by rendering the XR object based at least on the pose. Flag data is set, in a memory area of the at least one memory, indicative of whether or not the displayed XR object is consistent in pose with the real object. The method includes outputting, to a separate computing device having another processor, second image frames in the camera data sequence acquired when the flag data indicates that the displayed XR object is consistent in pose with the real object.

20 Claims, 12 Drawing Sheets

METHODS AND DEVICES FOR EXTENDED REALITY DEVICE TRAINING DATA CREATION

BACKGROUND

1. Technical Field

The disclosure relates generally to the field extended reality, and more specifically to methods and systems for creation of training data for use in an extended reality device.

2. Related Art

Extended reality (XR) has become increasingly common with the advancement of computer technology. Extended reality includes augmented reality (AR), virtual reality (VR), and mixed reality (MR). A general definition of AR is capturing a real-world scene and adding artificial (virtual) elements using software. In virtual reality a completely artificial (virtual) scene is created and displayed to a user. Mixed reality generally merges real-world and virtual-world elements to produce a hybrid reality in which physical and digital objects coexist and interact.

One platform for implementing XR is the smartphone or tablet computer. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement XR.

Another platform is the head mounted display (HMD) which can implement AR providing richer XR experience. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

In at least some known XR systems (and particularly in AR and MR systems), one or more real-world objects is detected and its pose is tracked. Thus, virtual content can be displayed relative to the tracked real-world object(s).

The object detection algorithms are commonly trained to recognize specific objects using images of the object captured with a camera. In at least some known systems, the initial stages of the training process are time consuming and performed manually. In such manual training, a trainer positions the object, captures numerous images of the object from numerous different angles of view using the camera of the XR system, and uploads the images to a training computer. Using the training computer, the trainer aligns a three-dimensional (3D) model of the object to the image of the object in each captured image, and training data is created based on the aligned images and the 3d model. Training based on images captured with a camera is commonly either time-consuming because of the need to capture many images and manually align the images to the 3D model, or produces lower quality training data because fewer images from fewer angles of view are captured in order to reduce the time required to complete the training.

In some other training processes, rather than using images of a real object, synthetic 2D images are created directly from the 3D model of the real object. The training computer creates training data based on the synthetic images. The synthetic images commonly lack all or some of the features that are present in a real object, such as texture, color, or the like. Additionally, the synthetic images generally lack the environmental influences (lighting impacts, camera variable/distorting, noise, background objects, etc.) that may affect the capture of an image of a real object using an XR device.

SUMMARY

To improve the accuracy of XR systems and reduce the amount of time and effort required to train an XR system, embodiments of the present disclosure utilize original training data that may be less accurate than desired. For example, the training data may be based on few poses (or only one pose) of the object to be tracked, may be based on only the shape (or edges) of the object (without any data about surface features, such as color, texture, etc.), or the like. The training data is then updated based on real-world images captured by the XR device after it begins successfully tracking the real-world object.

An advantage of some aspects of the disclosure is to solve at least a part of the problems described above, and aspects of the disclosure can be implemented as the following aspects.

One aspect of the disclosure is a method for one or more processors to implement in an extended reality (XR) device including a camera, the one or more processors, at least one memory, and a display. The method includes acquiring, from the camera, a camera data sequence including a first image frame of a real object in a scene, and tracking a pose of the real object with respect to the camera along the camera data sequence. The pose is derived based at least on the first image frame and original training data generated from at least one of (i) a synthetic image of a 3D model rendered from a predetermined view and (ii) a camera image of a reference real object captured from the view. The 3D model and the reference real object correspond to the real object. The method includes displaying an XR object on the display by rendering the XR object based at least on the pose, and setting flag data, in a memory area of the at least one memory, indicative of whether or not the displayed XR object is consistent in pose with the real object, in response to receipt of an input of a user of the XR device. Second image frames in the camera data sequence acquired when the flag data indicates that the displayed XR object is consistent in pose with the real object are stored in another memory area of the at least one memory, and the stored second image frames are output to a separate computing device having another processor.

Another aspect of the present disclosure is a method for one or more processors to implement in an extended reality (XR) device including a camera, the one or more processors, at least one memory, and a display. The method includes acquiring, from the camera, a camera data sequence including a first image frame of a real object in a scene, and tracking a pose of the real object with respect to the camera along the camera data sequence. The pose is derived based at least on the first image frame and original training data generated from at least one of (i) a synthetic image of a 3D model rendered from a predetermined view and (ii) a camera image of a reference real object captured from the view. The 3D model and the reference real object correspond to the real object. The method includes displaying an XR object on the display by rendering the XR object based at least on the pose, and setting flag data, in a memory area of the at least one memory, indicative of whether or not the displayed XR object is consistent in pose with the real object, in response to receipt of an input of a user of the XR device. The method includes outputting, to a separate computing device having another processor, second image frames in the camera data sequence acquired when the flag data indicates that the displayed XR object is consistent in pose with the real object.

Still another aspect of the present disclosure is a method for one or more processors to implement in a computing device including the one or more processors and a memory storing original training data for tracking a real object using an extended reality (XR) device. The method includes receive image frames of the real object acquired by the XR device, extracting feature data of the real object from the second image frames, and generating another training data to replace or update the original training data. The another training data based at least in part on the extracted feature data. The images were acquired when flag data indicated that an XR object displayed on the XR device was consistent in pose with the real object. The feature data includes the tracked pose of the real object in the respective second image frames.

Yet another aspect of the present disclosure is a method for one or more processors to implement in an extended reality (XR) device including a camera, the one or more processors, at least one memory, and a display. The method includes acquiring, from the camera, a camera data sequence including a first image frame of a real object in a scene, and tracking a pose of the real object with respect to the camera along the camera data sequence. The pose is derived based at least on the first image frame and original training data generated from at least one of (i) a synthetic image of a 3D model rendered from a predetermined view and (ii) a camera image of a reference real object captured from the view. The 3D model and the reference real object correspond to the real object. The method includes displaying an XR object on the display by rendering the XR object based at least on the pose, and setting flag data, in a memory area of the at least one memory, indicative of whether or not the displayed XR object is consistent in pose with the real object, in response to receipt of an input of a user of the XR device. The method includes extracting feature data of the real object from second image frames in the camera data sequence acquired when the flag data indicates that the displayed XR object is consistent in pose with the real object. The feature data includes the tracked pose of the real object in the respective second image frames. Another training data is generated to replace or update the original training data. The another training data is based at least in part on the extracted feature data.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The extended reality (XR) methods described herein may be implemented on any suitable device or system that includes a camera and a display. Such suitable devices may include, for example, a mobile phone, a tablet computer, a desktop computer (with a camera), a smart watch, a digital camera, an XR headset (e.g., a transparent HMD), or the like. All such suitable devices may be referred to generally as an XR device. Embodiments of the instant disclosure will be described with reference to an HMD, but as noted above the methods may be implemented, with appropriate modification, on any suitable device or system that includes a camera and a display. Moreover, examples will be described herein with reference to augmented reality (AR), but the methods may be implemented, with appropriate modification, in virtual reality (VR), mixed reality (MR), or any other XR system.

Figure 1:
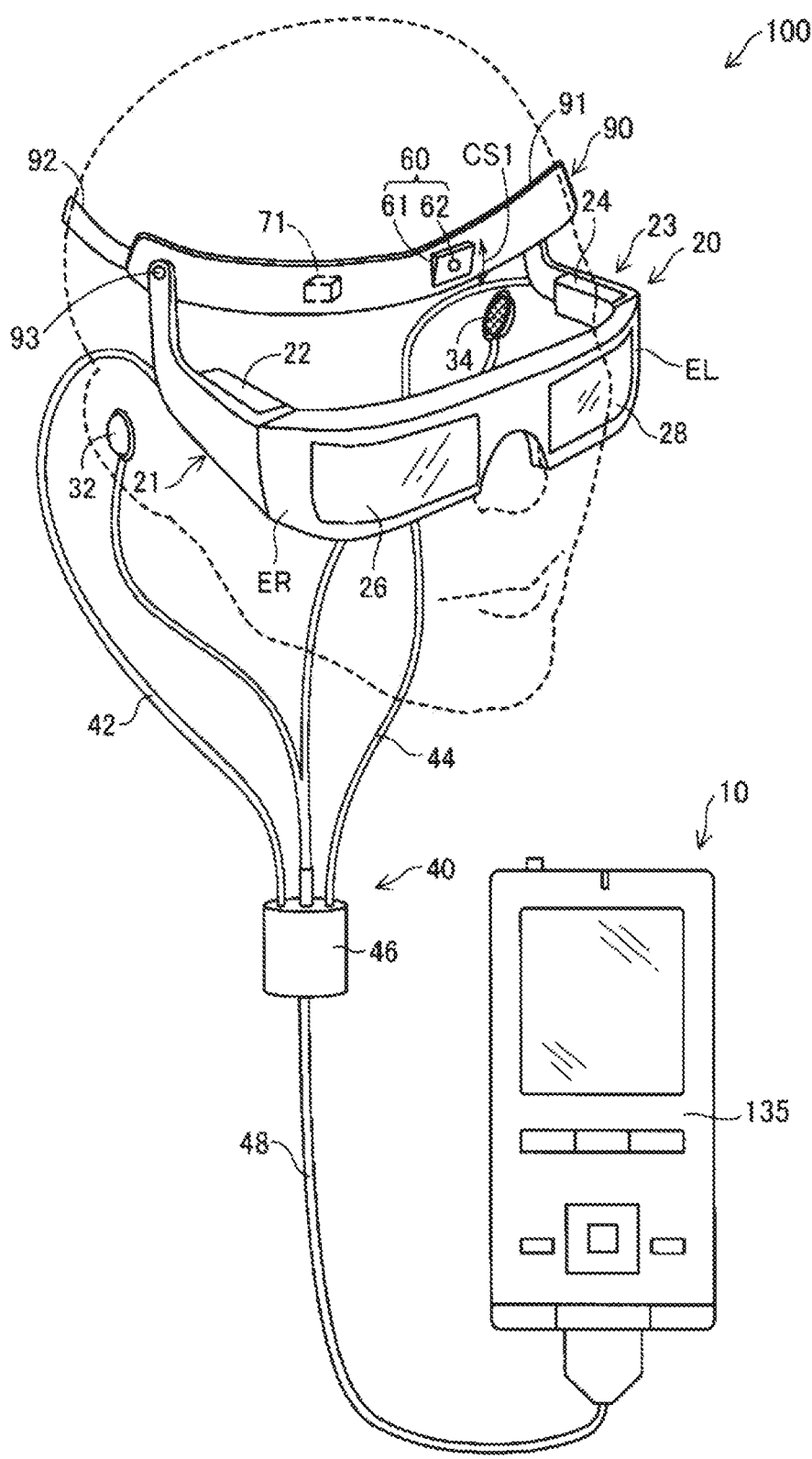
FIG. 1 is a diagram illustrating a schematic configuration of an example HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
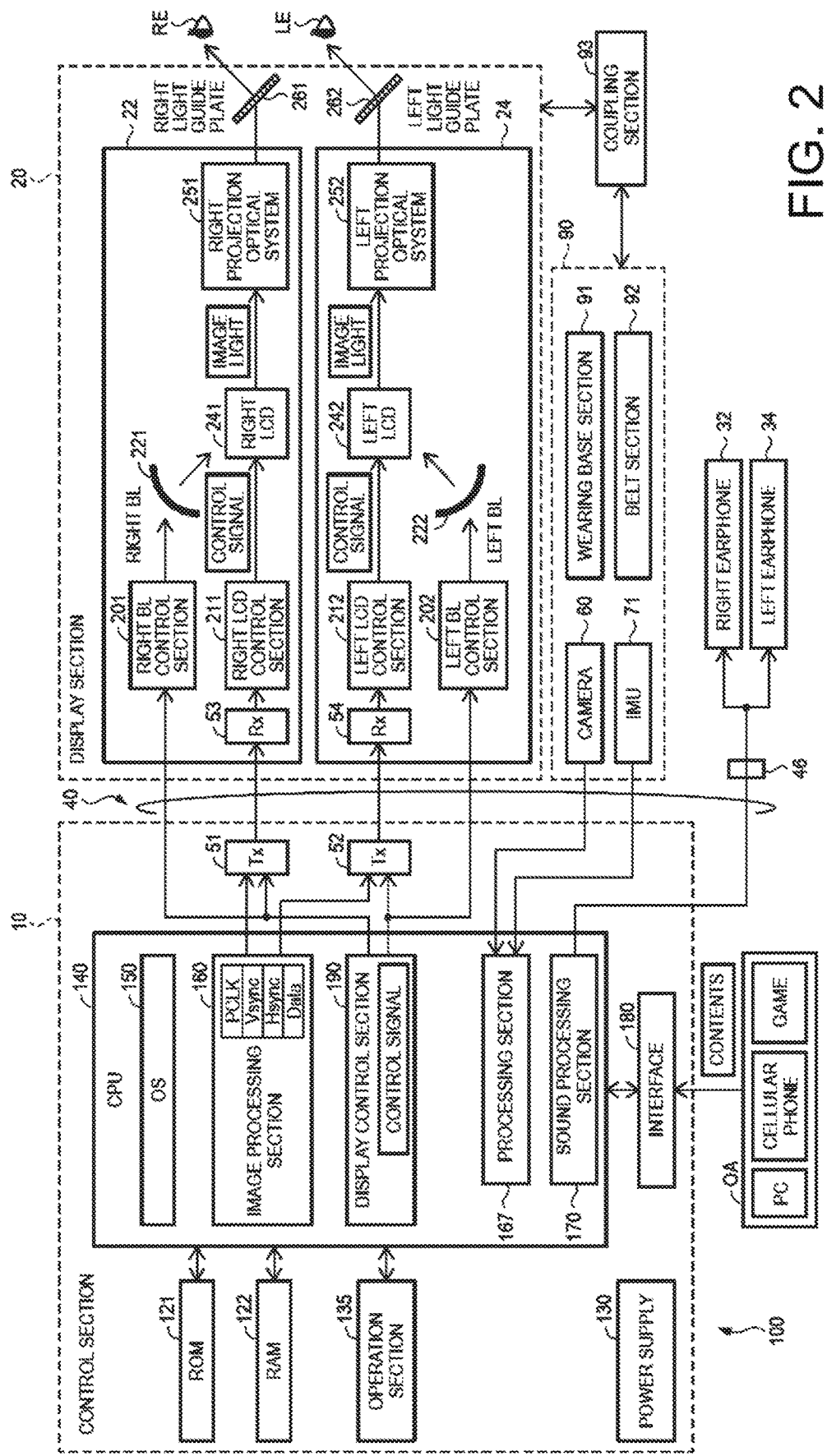
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter 51 (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a homography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. For example, the device may be an imaging device that has no function of displaying an image. In other embodiments, the technology disclosed as an embodiment may be applied to any suitable device including a camera and a display, such as a mobile phone, a tablet computer, and the like.

Figure 3:
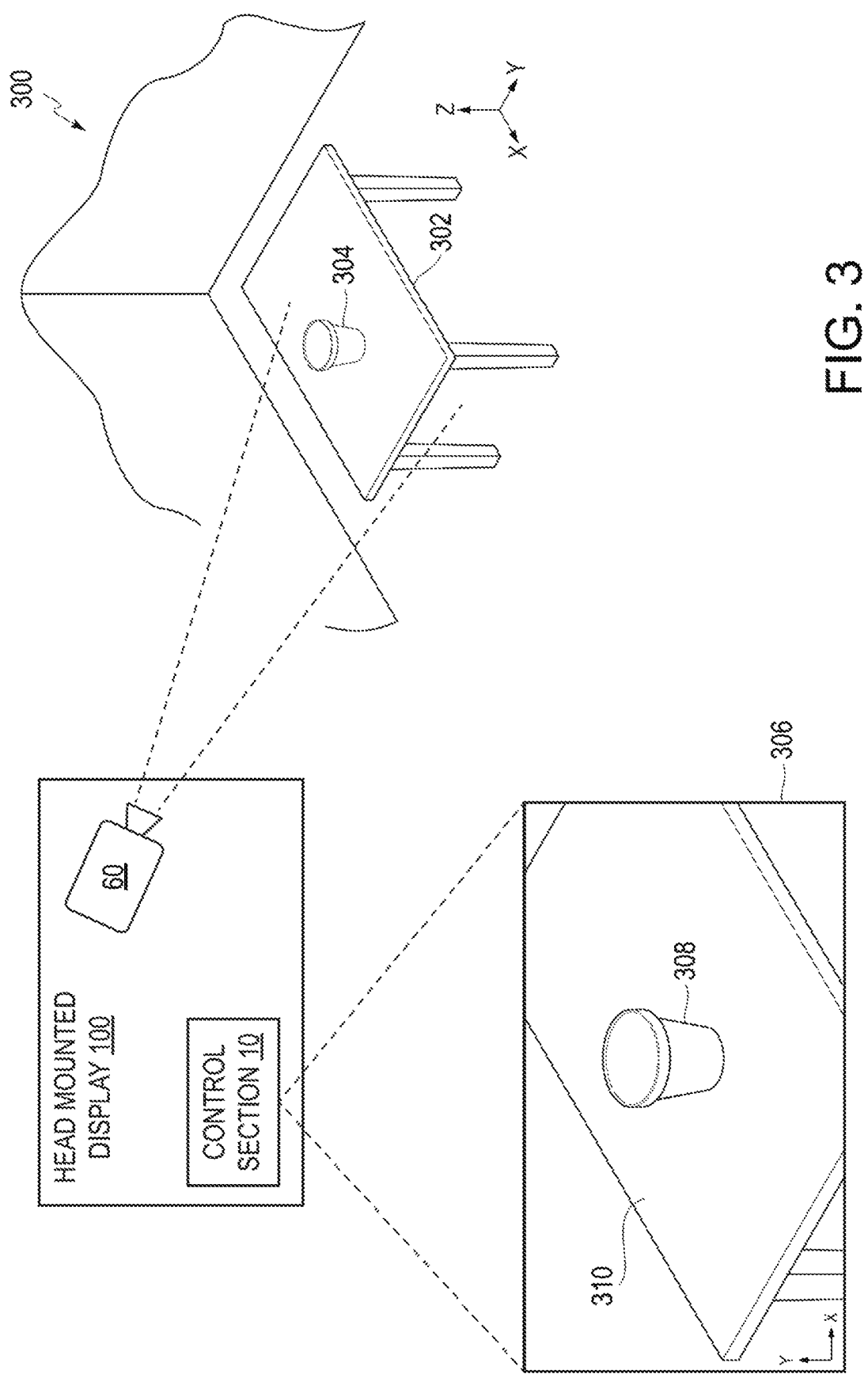
FIG. 3 is a diagram illustrating use of the HMD shown in FIGS. 1 and 2 in a three dimensional (3D) real-world scene.

FIG. 3 is a diagram illustrating use of the HMD 100 in a three dimensional (3D) real-world scene 300. Scene 300 includes a table 302 and an object 304 on the table 302. A user (not shown) wearing HMD 100 is positioned to view the scene 300. The camera 60 of the HMD 100 also views the scene 300 from approximately the same viewpoint as the user. In some embodiments a calibration is performed to align the 3D coordinate system of the camera 60 with the 3D coordinate system of the user in order to attempt to minimize any difference between the viewpoint of the camera and the viewpoint of the user. The camera 60 captures images of the scene 300 from the viewpoint and provides an image data stream to the control section 10. The image data stream includes multiple temporally separate two dimensional (2D) image frames. FIG. 3 includes an example image frame 306, sometimes referred to as an image, received by the control section 10. The image frame 306 includes a representation 308 of the object 304 as viewed from the camera's viewpoint and a representation 310 of a portion of the table 302. A representation of an object, such as the representation 308 of object 304, in an image frame is sometimes also referred to herein as the object in the image frame.

As will be explained in more detail herein, the control section 10 attempts to locate the representation 310 of the object 304 in the image frame 306 and determine its pose. The control section 10 then attempts to track the representation 310 of the object 304 and update the pose of the object through subsequent image frames.

In the example embodiment described herein, the target pose estimation process relies on the use of previously prepared templates. The templates are at least a part of the training data discussed herein. An example description of preparation of such templates is included below. It should be understood that the pose estimation process may use templates created using different techniques and other pose estimation processes may be used that do not use any templates.

Template Creation

In an example embodiment, the templates are created by a template creator (not shown) that renders a 2D model of the target object on a virtual plane on the basis of a view $V_n$ of a 3D CAD as a 3D model. Other embodiments use camera images of the target object rather than a rendered 2D model. The template creator detects edges of an image obtained through the rendering, further extracts a contour, and selects a plurality of 2D model points included in the contour. A position of a selected 2D model point and gradient (a gradient vector of luminance) at the position of the 2D model point are represented by a contour feature CF. The template creator performs inverse transformation on a 2D model point $p_i$ represented by a contour feature $CF_i$ in the two dimensional space so as to obtain a 3D model point $P_i$ in the three dimensional space corresponding to the contour feature $CF_i$. Here, the 3D model point $P_i$ is represented in the object coordinate system. The template in the view $V_n$ includes elements expressed by the following Equation (1).

$$(CF_{1n}, CF_{2n}, \ldots, 3DP_{1n}, 3DP_{2n}, \ldots, V_n) \quad (1)$$

In Equation (1), a contour feature and a 3D model point (for example, $CF_{1n}$ and $3DP_{1n}$) with the same suffix are correlated with each other. A 3D model point which is not detected in the view $V_n$ may be detected in a view $V_m$ or the like which is different from the view $V_n$.

If a 2D model point p is provided, the template creator treats the coordinates of the 2D model point p as integers representing a corner of a pixel. Therefore, a depth value of the 2D model point p corresponds to coordinates of (p+0.5). As a result, the template creator uses the coordinates of (p+0.5) for inversely projecting the 2D point p. When a recovered 3D model point is projected, the template creator truncates floating-point coordinates so as to obtain integer coordinates.

The created templates are stored in memory of the device that is performing target object pose estimation, such as in ROM 121 of HMD 100.

Figure 4:
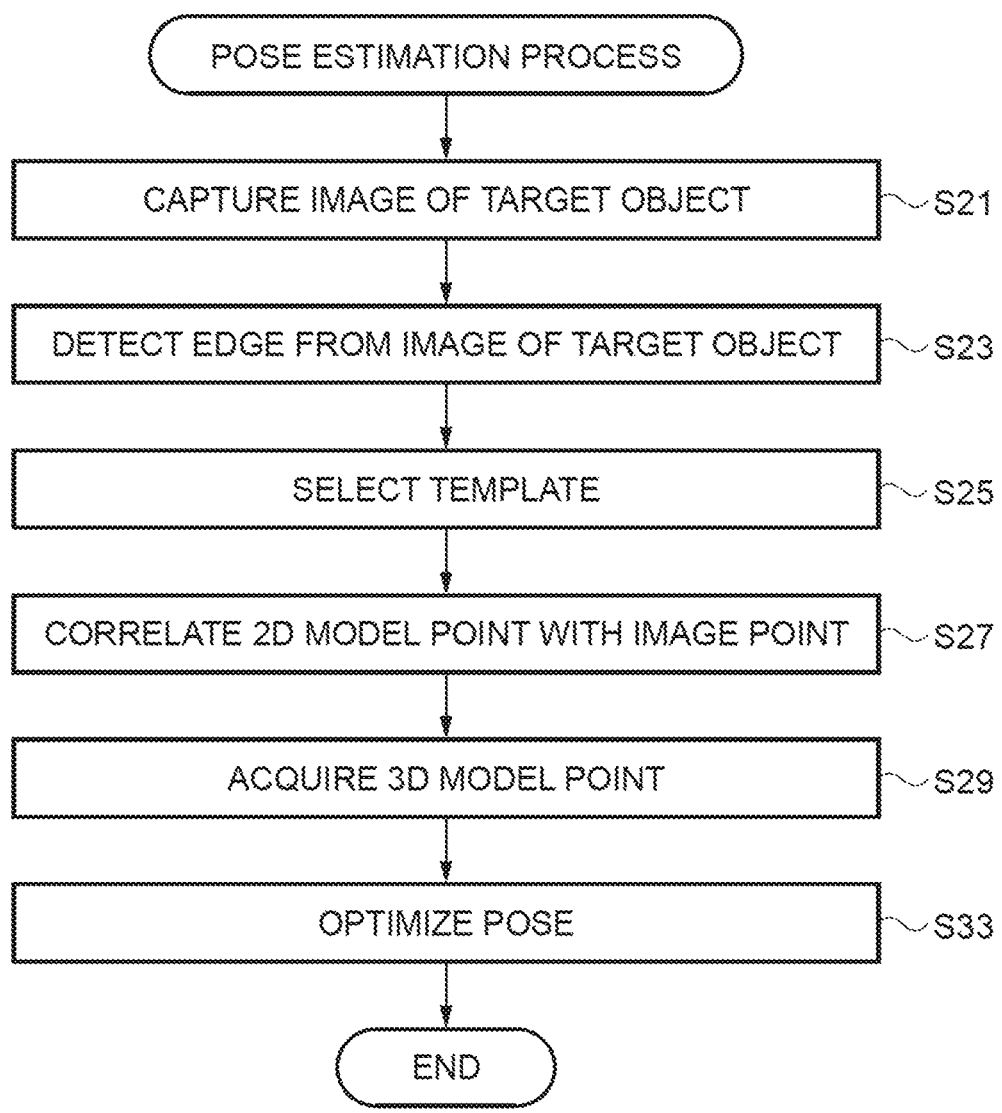
FIG. 4 is a flowchart illustrating a target object pose estimation process.

FIG. 4 is a flowchart illustrating a target object pose estimation process. The process will be described with reference to the HMD 100, but may be performed with any suitable device. Moreover, the methods and systems described herein are not limited to using the target object pose estimation process described herein, but may use any suitable technique or techniques for identifying a target object, estimating its pose and tracking the pose of the target object.

In the pose estimation process of FIG. 4, first, the processing section 167 images external scenery including a target object with the camera 60 (step S21). The processing section 167 performs edge detection described below on a captured image of the target object (step S23).

Edge Detection (Step S23)

The processing section 167 detects an edge of the image of the target object in order to correlate the imaged target object with a template corresponding to the target object. The processing section 167 computes features serving as the edge on the basis of pixels of the captured image. In the present embodiment, the processing section 167 computes gradient of luminance of the pixels of the captured image of the target object so as to determine the features. When the edge is detected from the captured image, objects other than the target object in the external scenery, different shadows, different illumination, and different materials of objects included in the external scenery may influence the detected edge. Thus, it may be relatively difficult to detect the edge from the captured image may than to detect an edge from a 3D CAD model. In the present embodiment, in order to more easily detect an edge, the processing section 167 only compares an edge with a threshold value and suppresses non-maxima, in the same manner as in procedures performed in a simple edge detection method.

Selection of Template (Step S25)

If the edge is detected from the image of the target object, the processing section 167 selects a template having a view closest to the pose of the target object in a captured image thereof from among templates stored in a template storage of HMD 100 (step S25). The template storage may be in ROM 121, or any other suitable storage device.

For this selection, an existing three-dimensional pose estimation algorithm for estimating a rough pose of a target object may be used separately. The processing section 167 may find a new training view closer to the pose of the target object in the image than the selected training view when highly accurately deriving a 3D pose. In a case of finding a new training view, the processing section 167 highly accurately derives a 3D pose in the new training view. In the present embodiment, if views are different from each other, contour features as a set of visually recognizable edges including the 2D outline of the 3D model are also different from each other, and thus a new training view may be found. The processing section 167 uses a super-template for a problem that sets of visually recognizable edges are different from each other, and thus extracts as many visually recognizable edges as possible. In another embodiment, instead of using a template created in advance, the processing section 167 may image a target object, and may create a template by using 3D CAD data while reflecting an imaging environment such as illumination in rendering on the fly and as necessary, so as to extract as many visually recognizable edges as possible.

2D Point Correspondences (Step S27)

If the process in step S25 is completed, the processing section 167 correlates the edge of the image of the target object with 2D model points included in the template (step S27).

Figure 5:
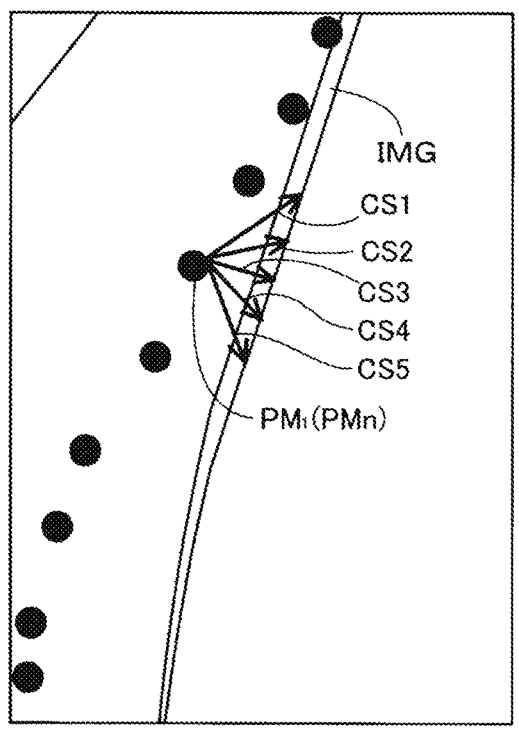
FIG. 5 is a diagram illustrating that a single 2D model point is combined with a plurality of image points included in a certain edge.
Figure 6:
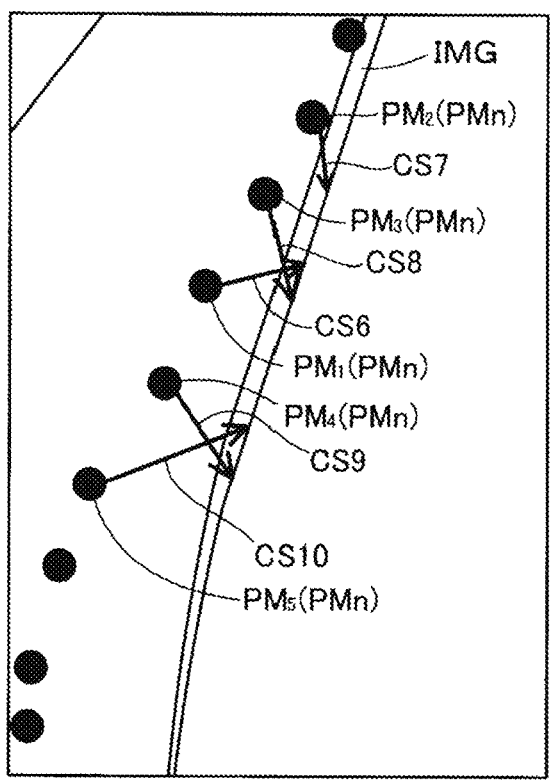
FIG. 6 is a diagram illustrating an example in which a 2D model point is combined with wrong image points.

FIG. 5 is a diagram illustrating that a single 2D model point is combined with a plurality of image points included in a certain edge. FIG. 6 is a diagram illustrating an example in which a 2D model point is combined with wrong image points. FIGS. 5 and 6 illustrate a captured image IMG of the target object OBm, a partial enlarged view of the 2D model point set PMn, and a plurality of arrows CS in a case where the target object OBm corresponding to a 3D model is imaged by the camera 60. As illustrated in FIG. 5, a portion of an edge detected from the image IMG of the target object OBm which is correlated with a 2D model point $PM_1$ which is one of the 2D model points included in a template includes a plurality of options as in the arrows CS1 to CS5. FIG. 6 illustrates an example in which 2D model points $PM_1$ to $PM_5$ included in the template and arranged are wrongly combined with an edge (image points included therein) detected from the image IMG of the target object OBm. In this case, for example, in FIG. 6, despite the 2D model points $PM_2$, $PM_3$, $PM_1$, $PM_4$ and $PM_5$ being arranged from the top, the arrows CS7, CS6, CS8, CS10 and CS9 are arranged in this order in the edge of the image IMG of the target object OBm. Thus, the arrow CS8 and the arrow CS6, and the arrow CS9 and the arrow CS10 are changed. As described above, the processing section 167 is required to accurately correlate 2D model points included in a template with image points included in an edge of the image IMG of the target object OBm to accurately estimate or derive a pose of the imaged target object OBm.

In the present embodiment, the processing section 167 computes similarity scores by using the following Equation (2) with respect to all image points included in a local vicinity of each projected 2D model point.

$$SIM(p, p') = \left| \vec{\varepsilon}_p \cdot \vec{\nabla} I_{p'} \right| \Big/ \max_{q \in N(p)} \left\| \vec{\nabla} I_p \right\| \quad (2)$$

The measure of similarity scores indicated in Equation (2) is based on matching between a gradient vector (hereinafter, simply referred to as gradient) of luminance of a 2D model point included in a template and a gradient vector of an image point, but is based on an inner product of the two vectors in Equation (2) as an example. The vector of Ep in Equation (2) is a unit length gradient vector of a 2D model point (edge point) p. The processing section 167 uses gradient $\vec{\nabla}_I$ of a test image (input image) in order to compute features of an image point p' when obtaining the similarity scores. The normalization by the local, maximum of the gradient magnitude in the denominator in Expression (11) ensures that the priority is reliably given to an edge with a locally high intensity. This normalization prevents an edge which is weak and thus becomes noise from being collated. The processing section 167 enhances a size N(p) of a nearest neighborhood region in which a correspondence is searched for when the similarity scores are obtained. For example, in a case where an average of position displacement of a projected 2D model point is reduced in consecutive iterative computations, N (p) may be reduced. Hereinafter, a specific method for establishing correspondences using Equation (2) will be described.

Figure 7:
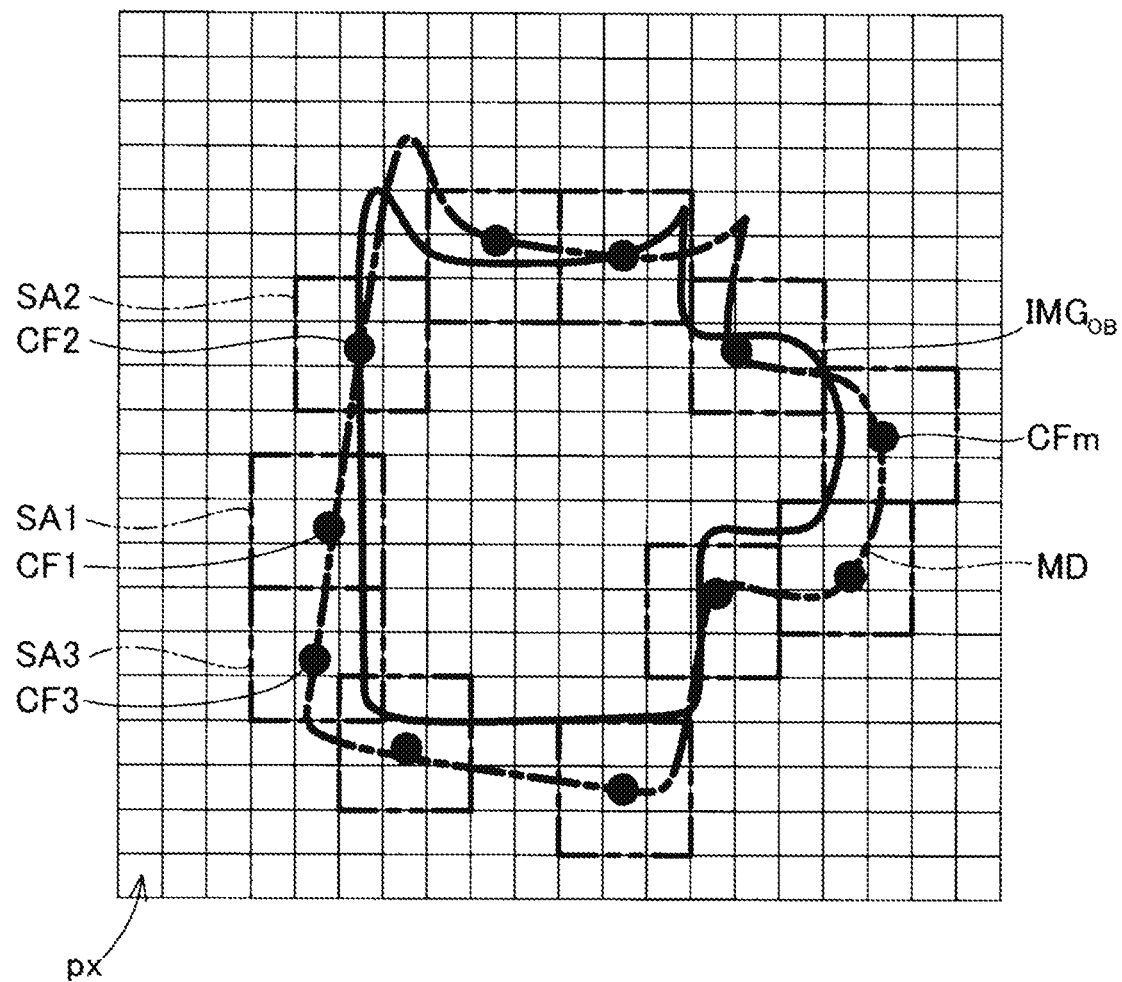
FIGS. 7 to 9 are diagrams illustrating an example of computation of similarity scores.
Figure 8:
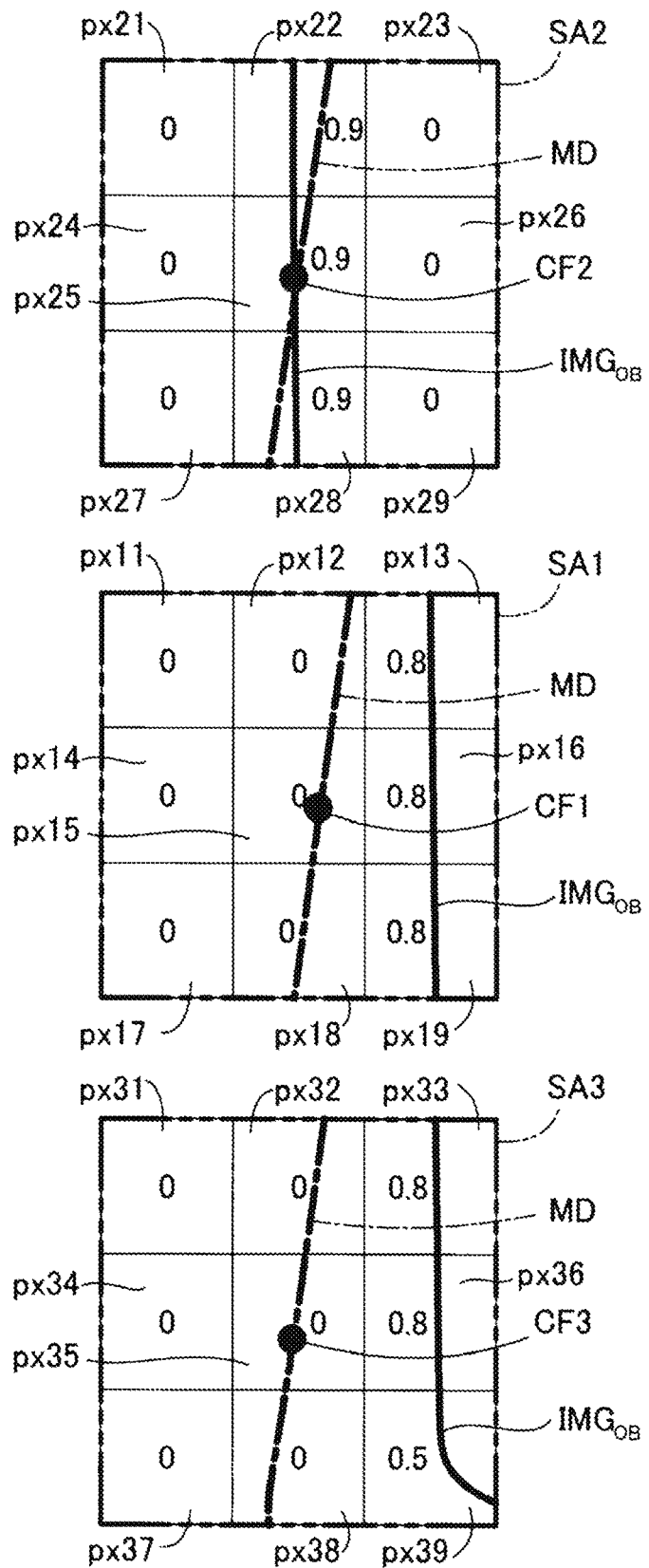
Figure 9:
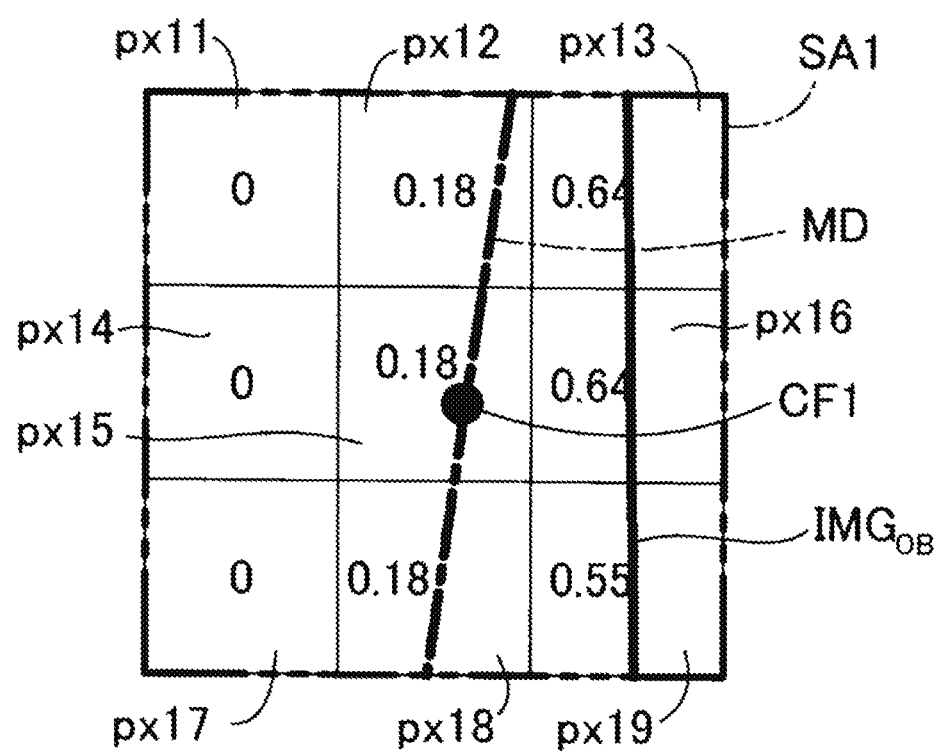

FIGS. 7 to 9 are diagrams illustrating an example of computation of similarity scores. FIG. 7 illustrates an image $IMG_{OB}$ (solid line) of a target object captured by the camera 60, a 2D model MD (dot chain line) based on a template similar to the image $IMG_{OB}$ of the target object, and 2D model points as a plurality of contour features CFm in the 2D model MD. FIG. 7 illustrates a plurality of pixels px arranged in a lattice form, and a region (for example, a region SA1) formed of 3 pixels×3 pixels centering on each of the contour features CFm. FIG. 7 illustrates the region SA1 centering on the contour feature CF1 which will be described later, a region SA2 centering on a contour feature CF2, and a region SA3 centering on a contour feature CF3. The contour feature CF1 and the contour feature CF2 are adjacent to each other, and the contour feature CF1 and the contour feature CF3 are also adjacent to each other. In other words, the contour features are arranged in order of the contour feature CF2, the contour feature CF1, and the contour feature CF3 in FIG. 7.

As illustrated in FIG. 7, since the image $IMG_{OB}$ of the target object does not match the 2D model MD, the processing section 167 correlates image points included in an edge of the image $IMG_{OB}$ of the target object with 2D model points represented by the plurality of contour features CFm of the 2D model MD, respectively, by using Equation (2). First, the processing section 167 selects the contour feature CF1 as one of the plurality of contour features CFm, and extracts the region SA1 of 3 pixels×3 pixels centering on a pixel px including the contour feature CF1. Next, the processing section 167 extracts the region SA2 and the region SA3 of 3 pixels×3 pixels respectively centering on the two contour features such as the contour feature CF2 and the contour feature CF3 which are adjacent to the contour feature CF1. The processing section 167 calculates a score by using Equation (2) for each pixel px forming each of the regions SA1, SA2 and SA3. In this stage, the regions SA1, SA2 and SA3 are matrices having the same shape and the same size.

FIG. 8 illustrates enlarged views of the respective regions SA1, SA2 and SA3, and similarity scores calculated for the respective pixels forming the regions SA1, SA2 and SA3. The processing section 167 calculates similarity scores between the 2D model point as the contour feature and the nine image points. For example, in the region SA3 illustrated on the lower part of FIG. 8, the processing section 167 calculates, as scores, 0.8 for pixels px33 and px36, 0.5 for a pixel px39, and 0 for the remaining six pixels. The reason why the score of 0.8 for the pixels px33 and px36 is different from the score of 0.5 for the pixel px39 is that the image $IMG_{OB}$ of the target object in the pixel px39 is bent and thus gradient differs. As described above, the processing section 167 calculates similarity scores of each pixel (image point) forming the extracted regions SA1, SA2 and SA3 in the same manner.

Hereinafter, a description will be made focusing on the contour feature CF1. The processing section 167 calculates a corrected score of each pixel forming the region SA1. Specifically, the similarity scores are averaged with weighting factors by using pixels located at the same matrix positions of the regions SA2 and SA3 as the respective pixels forming the region SA1. The processing section 167 performs this correction of the similarity scores not only on the contour feature CF1 but also on the other contour features CF2 and CF3. In the above-described way, it is possible to achieve an effect in which a correspondence between a 2D model point and an image point is smoothed. In the example illustrated in FIG. 8, the processing section 167 calculates corrected scores by setting a weighting factor of a score of each pixel px of the region SA1 to 0.5, setting a weighting factor of a score of each pixel px of the region SA2 to 0.2, and setting a weighting factor of a score of each pixel px of the region SA3 to 0.3. For example, 0.55 as a corrected score of the pixel px19 illustrated in FIG. 9 is a value obtained by adding together three values such as a value obtained by multiplying the score of 0.8 for the pixel px19 of the region SA1 by the weighting factor of 0.5, a value obtained by multiplying the score of 0 for the pixel px29 of the region SA2 by the weighting factor of 0.2, and a value obtained by multiplying the score of 0.5 for the pixel px39 of the region SA3 by the weighting factor of 0.3. The weighting factors are inversely proportional to distances between the processing target contour feature CF1 and the other contour features CF2 and CF3. The processing section 167 determines an image point having the maximum score among the corrected scores of the pixels forming the region SA1, as an image point correlated with the contour feature CF1. In the example illustrated in FIG. 9, the maximum value of the corrected scores is 0.64 of the pixels px13 and px16. In a case where a plurality of pixels have the same corrected score, the processing section 167 selects the pixel px16 whose distance from the contour feature CF1 is shortest, and the processing section 167 correlates the contour feature CF1 with an image point of the pixel px16. The processing section 167 compares edges detected in a plurality of images of the target object captured by the camera 60 with 2D model points in a template in a view close to the images of the target object, so as to determine image points of the target object corresponding to the 2D model points (contour features CF).

If the processing section 167 completes the process in step S27 in FIG. 4, the processing section 167 acquires 3D model points corresponding to the 2D model points correlated with the image points and information regarding the view which is used for creating the 2D model points, from the template of the target object stored in the template storage (step S29). The processing section 167 derives a pose of the target object imaged by the camera 60 on the basis of the extracted 3D model points and information regarding the view, and the image points (step S33). Details of the derivation are as follows.

Optimization of Pose (Step S33)

In the present embodiment, the processing section 167 highly accurately derives or refines a 3D pose of the target object by using contour features included in a template corresponding to a selected training view, and 3D model points corresponding to 2D model points included in the contour features. In the derivation, the processing section 167 derives a pose of the target object by performing optimization computation for minimizing Equation (5).

If the processing section 167 completes establishing the correspondences between 2D model points and the image points in a predetermined view, the processing section 167 reads 3D model points $P_i$ corresponding to the 2D model points (or the contour features $CF_i$) from a template corresponding to the view. In the present embodiment, as described above, the 3D model points $P_i$ corresponding to the 2D model points are stored in the template. However, the 3D model points $P_i$ are not necessarily stored in the template, and the processing section 167 may inversely convert the 2D model points whose correspondences to the image points is completed, every time on the basis of the view, so as to obtain the 3D model points $P_i$.

The processing section 167 reprojects locations of the obtained 3D model points $P_i$ onto a 2D virtual plane on the basis of Equation (3).

$$\pi(P_i)=(u_i,v_i)^T \quad (3)$$

Here, $\pi$ in Equation (3) includes a rigid body transformation matrix and a perspective projecting transformation matrix included in the view. In the present embodiment, three parameters indicating three rotations about three axes included in the rigid body transformation matrix and three parameters indicating three translations along the three axes are treated as variables for minimizing Equation (5). The rotation may be represented by a quaternion. The image points $p_i$ corresponding to the 3D model points $P_i$ are expressed as in Equation (4).

$$p_i=(p_{ix},p_{iy})^T \quad (4)$$

The processing section 167 derives a 3D pose by using the cost function expressed by the following Equation (5) in order to minimize errors between the 3D model points $P_i$ and the image points $p_i$.

$$E_{match} = \sum_{i=1}^{N} w_i * \|\pi(P_i) - p_i\| = \sum_{i=1}^{N} w_i * ((u_i - p_{ix})^2 + (v_i - p_{iy})^2) \quad (5)$$

Here, $w_i$ in Equation (5) is a weighting factor for controlling the contribution of each model point to the cost function. A point which is projected onto the outside of an image boundary or a point having low reliability of the correspondence is given a weighting factor of a small value. In the present embodiment, in order to present specific adjustment of a 3D pose, the processing section 167 determines minimization of the cost function expressed by Equation (5) as a function of 3D pose parameters using the Gauss-Newton method, if one of the following three items is reached:

1. An initial 3D pose diverges much more than a preset pose. In this case, it is determined that minimization of the cost function fails.

2. The number of times of approximation using the Gauss-Newton method exceeds a defined number of times set in advance.

3. A relative pose change in the Gauss-Newton method is equal to or less than a preset threshold value. In this case, it is determined that the cost function is minimized.

When a 3D pose is derived, the processing section 167 may attenuate refinement of a pose of the target object. Time required to process estimation of a pose of the target object directly depends on the number of iterative computations which are performed so as to achieve high accuracy (refinement) of the pose. From a viewpoint of enhancing the system speed, it may be beneficial to employ an approach that derives a pose through as small a number of iterative computations as possible without compromising the accuracy of the pose. According to the present embodiment, each iterative computation is performed independently from its previous iterative computation, and thus no constraint is imposed, the constraint ensuring that the correspondences of 2D model points are kept consistent, or that the same 2D model points are correlated with the same image structure or image points between two consecutive iterative computations. As a result, particularly, in a case where there is a noise edge structure caused by a messy state in which other objects which are different from a target object are mixed in an image captured by the camera 60 or a state in which shadows are present, correspondences of points are unstable. As a result, more iterative computations may be required for convergence. According to the method of the present embodiment, this problem can be handled by multiplying the similarity scores in Equation (2) by an attenuation weighting factor shown in the following Equation (6).

$$w(\overrightarrow{\Delta p}) = e^{-(\|\Delta p\|^2)/\sigma^2} \quad (6)$$

Equation (6) expresses a Gaussian function, and $\sigma$ has a function of controlling the strength (effect) of attenuation. In a case where a value of $\sigma$ is great, attenuation does not greatly occur, but in a case where a value of $\sigma$ is small, strong attenuation occurs, and thus it is possible to prevent a point from becoming distant from the present location. In order to ensure consistency in correspondences of points in different iterative computations, in the present embodiment, $\sigma$ is a function of a reprojecting error obtained through the latest several iterative computations. In a case where a reprojecting error (which may be expressed by Equation (5)) is considerable, in the method of the present embodiment, convergence does not occur. In an algorithm according to the present embodiment, $\sigma$ is set to a great value, and thus a correspondence with a distant point is ensured so that attenuation is not almost or greatly performed. In a case where a reprojecting error is slight, there is a high probability that a computation state using the algorithm according to the present embodiment may lead to an accurate solution.

Therefore, the processing section 167 sets 6 to a small value so as to increase attenuation, thereby stabilizing the correspondences of points.

To improve the accuracy of XR systems and reduce the amount of time and effort required to train an XR system, embodiments of the present disclosure initially utilize original training data that may be less accurate than desired, and then update the training data using images captured by the XR device while the XR device is successfully tracking the pose of a real-world object.

For example, the initial training data may be based on few poses (or only one pose) of the object to be tracked. In such embodiments, to detect and begin tracking the object, the user may need to move around a real-world object until her view of the object is similar to the view at which one of the poses was captured to create the original training data. Original training data based on one or a few poses of the object may be based on synthetic image(s) of a 3D model (such as a CAD model) rendered from a predetermined view(s) and/or a camera image(s) of a reference real object captured from the predetermined view(s), where the 3D model and the reference real object correspond to the real object. Additionally, or alternatively, the original training data may be based on only the shape of the object, without any data about surface features, such as color, texture, surface images/text, etc.

Figure 10:
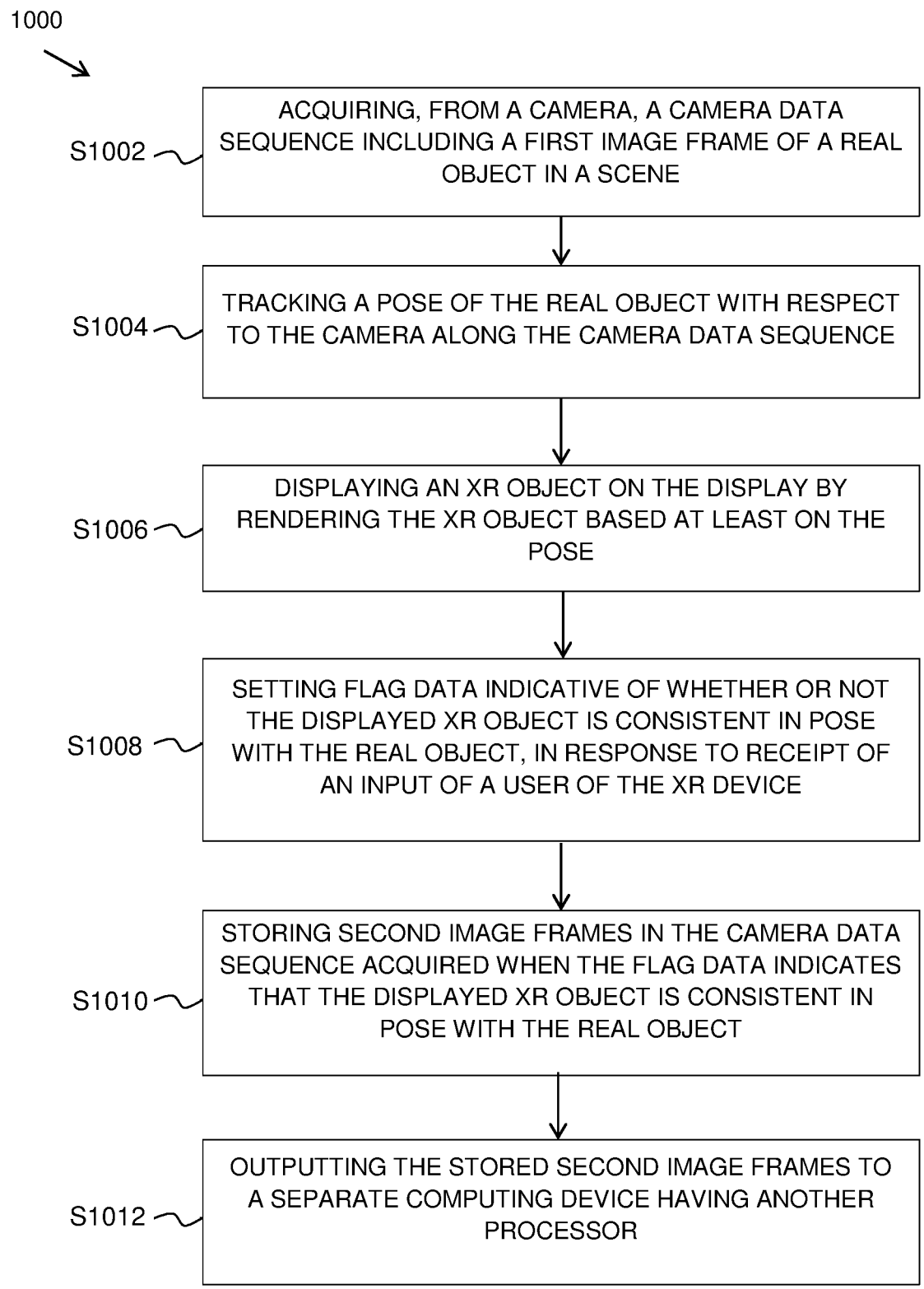
FIG. 10 is a flow diagram of an example embodiment of a method of updating training data for an extended reality device.

FIG. 10 is a flow diagram of an example embodiment of a method 1000 for one or more processors to implement in an XR device. The method 1000 will be described with respect to the HMD 100 and its components. However, the method 1000 may be used with any suitable device for XR, for example, a mobile phone, a computer connected to a camera, a tablet computer, and the like.

The method 1000 includes acquiring, from the camera 60, a camera data sequence including a first image frame of a real object in a scene (S1002). The processor 140 of the HMD 100 then tracks a pose of the real object with respect to the camera along the camera data sequence (S1004). The pose is derived based at least on the first image frame and original training data stored in memory of the HMD 100 (e.g., in ROM 121). The original training data is generated from at least one of (i) a synthetic image of a 3D model rendered from a predetermined view and (ii) a camera image of a reference real object captured from the view. The 3D model and the reference real object correspond to the real object. The pose may be estimated, for example, using the process described above based on template data in the original training data corresponding to the object at one or more known poses. In other embodiments any other suitable pose estimation process may be used. In some embodiments, the original training data may be generated from only one of the synthetic image or the camera image. Moreover, in some embodiments, original training data includes only shape-based training data. That is, the original training data is not based on feature data, such as surface texture, color, lighting, or the like.

At S1006, the processor 140 displays an XR object on the display section 20 by rendering the XR object based at least on the pose. Thus, for example, the XR object may be a display overlying the object at a particular portion of the object, which can be identified because of the pose, an XR object whose content relates to the pose (e.g., a message that "the object is upside down"), or any other XR object based on the pose.

The processor 140 sets flag data, in a memory area of the memory of HMD 100, indicative of whether or not the displayed XR object is consistent in pose with the real object (S1008). The flag data may be set, for example, in RAM 122 or another memory device of HMD 100. The memory area may be a particular memory device (e.g., RAM 122, a specific flash-memory device, a specific hard disk drive, etc.) or may be an area within a particular memory device (e.g., a range of memory addresses).

The flag data is set response to receipt of an input of a user of the XR device. The user input indicates whether or not the displayed XR object is consistent in pose with the real object. Thus, for example, if the XR object is flashing lights intended to overlie the light bar on a real-world toy car, if the lights are displayed at the proper location in the car and properly aligned with the light bar, the user would input an indication that the displayed XR object is consistent in pose with the real object. The user input may be an input via a user interface of the HMD 100, or by any other suitable method of user input.

If, instead, the XR object is not consistent with the pose of the real object (such as if the flashing lights in the example are displayed on the tires of the car or perpendicular to the light bar), the user input would indicate that the displayed XR object is not consistent in pose with the real object. The user input that the displayed XR object is not consistent in pose with the real object may be an active input (for example, by selecting that the displayed XR object is not consistent in pose with the real object on a user interface), or a passive input (such as by simply not inputting that the displayed XR object is consistent in pose with the real object for a predetermined length of time). Thus, the absence of an input that indicates that the displayed XR object is consistent in pose with the real object is still an input indicating whether or not the displayed XR object is consistent in pose with the real object.

At S1010, the processor 140 stores, in another memory area of the memory of the HMD 100, second image frames (sometimes referred to as second images) in the camera data sequence acquired when the flag data indicates that the displayed XR object is consistent in pose with the real object. Thus, when the user inputs an indication that the displayed XR object is consistent in pose with the real object, and the flag data is appropriately set, the subsequent images in the camera data sequence (which are also used for tracking the object as the pose changes) are stored in memory. In an example embodiment, all image frames (the second image frames) for a predetermined length of time after the flag is set to indicate that the displayed XR object is consistent in pose with the real object are stored in memory.

In other embodiments, rather than storing all image frames for a predetermined length of time, a limited group of image frames in the camera data sequence is stored as the second image frames. The limited group may be for example, image frames selected at a predetermined interval (such as one frame every second, every tenth frame, etc.), or image frames based on content. Image frames may be selected as second images based on content, for example, based on whether they are acquired from a different view (or show a different pose) of the object than other second image frames. Thus, for example, if a user and the object remain perfectly stationary for a length of time, only one second image would be stored. The difference in pose may be any difference (no matter how slight), or may be a difference that exceeds some threshold difference (for example, a pose that differs by 1 degree of viewpoint in any direction, 5 degrees of viewpoint in any direction, 10 degrees of viewpoint in any direction, etc.). Additionally, or alternatively, the content based limiting may be based on the quality of the images.

Thus, for example, even if the pose is the same in multiple image frames, any image frames in which the object is blurry, overexposed, underexposed, etc., may not be saved. Further, in some embodiments, the limited group may be selected based on detected movement of the user and the HMD 100. Thus, when the HMD 100 is not moving, only one image may be saved as a second image. When the HMD 100 detects movement, additional image frames are saved as second images. Of course the above options for which images to save as second images may be combined in various combinations. For example, the processor could save as second images only the best (not overexposed or blurry) image frames acquired during a 1 second window every 5 seconds. Any other suitable combination or other technique for determining which (including all) image frames to save as second image frames may be used.

The stored image frames are output to a separate computing device having another processor at S1012. The stored images may be output at any subsequent time when the HMD 100 is communicatively coupled to the separate computing device. The communicative coupling may be a wired or wireless connection using any suitable communication protocol. The separate computing device uses the second images to create another training data to update the training data. The method performed by the separate computing device will be described below with reference to FIG. 11.

In some embodiments, the method includes receiving, after outputting the stored second image frames, such updated training data or another training data to replace the original training data or to update the original training data by adding the another one. The HMD 100 then uses the updated training data for subsequent object detection and tracking. In some embodiments, the method 1000 is performed repeatedly to further update and refine the training data. Thus, updated training data may be considered original training data for a subsequent performance of the method 1000.

Figure 11:
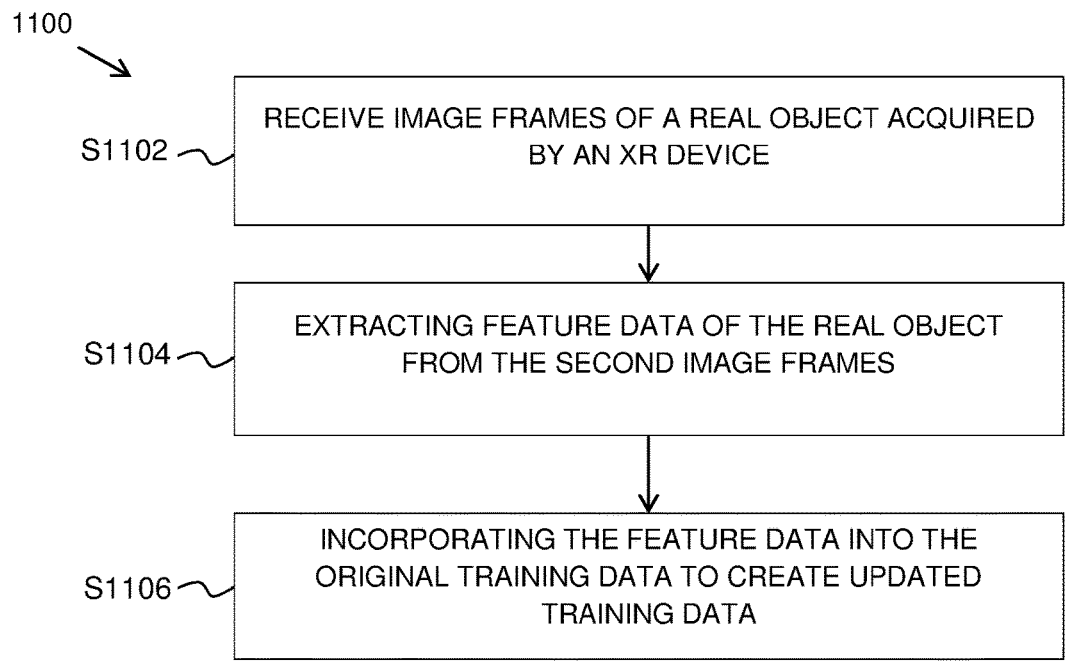
FIG. 11 is a flow diagram of an example embodiment of a method of updating training data for an extended reality device performed by a separate computing device.
Figure 12:
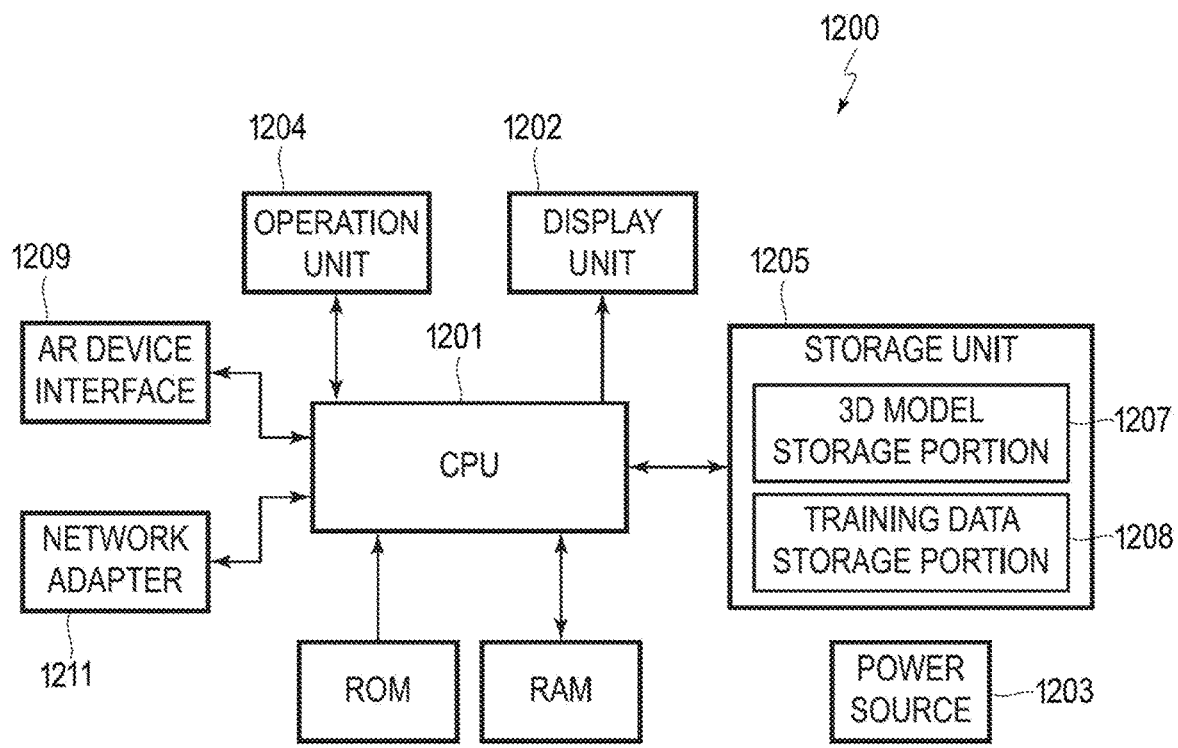
FIG. 12 is an example computing device for performing the method of FIG. 11.

As noted above, in the method 1000, the second image frames are output to a separate computing device. The method performed by the separate computing device will be described with reference to FIGS. 11 and 12. FIG. 11 is a flow diagram of an example embodiment of a method 1100 for one or more processors to implement in a computing device. FIG. 12 is a block diagram illustrating a functional configuration of a computer 1200 as the separate computing device in the present embodiment. The method 1100 will be described with respect to the computer 1200 and its components. However, the method 1200 may be used with any suitable computing device.

Referring to FIG. 12, the computer 1200 includes a CPU 1201 (sometimes also referred to as a processor or a processing device), a display unit 1202, a power source 1203, an operation unit 1204, a storage unit 1205, a ROM, a RAM, an XR interface 1209 and a network adaptor 1210. The power source 1203 supplies power to each unit of the computer 1200. The operation unit 1204 is a user interface (GUI) for receiving an operation from a user. The operation unit 1204 includes a keyboard, a mouse and a touch pad and the like and their driver software.

The storage unit 1205 stores various items of data and computer programs, and includes a hard disk drive, a solid-state drive, or the like. The storage unit 1205 includes a 3D model storage portion 1207 and a template storage portion 1208 (also sometimes referred to as a training data storage portion). The 3D model storage portion 1207 stores a three-dimensional model of a target object, created by using computer-aided design (CAD) or other 3D reconstruction methods. Other embodiments do not include the 3D model storage portion 1207. The training data storage portion 1208 stores the original training data and the additional training data created as described herein. The storage unit 1205 also stores instructions (not shown) for execution by the CPU 1201. The instructions cause the CPU 1201 to perform the methods described herein. The XR interface 1209 is an interface for communicative connection to an XR device, such as the HMD 100. The XR interface may be any wired or wireless interface suitable for establishing a data connection for communication between the computer 1200 and an XR device. The XR interface may be, for example, a Wi-Fi transceiver, a USB port, a Bluetooth® transceiver, a serial communication port, a proprietary communication port, or the like. The network adaptor 1210 is configured to allow CPU 1201 to connect to one or more networks to communicate with other computers, such as a server computer via a wireless network, so that, for example, the computer 1200 receives from the other computer a computer program that causes the computer 1200 to perform functions described in the embodiments described herein. In some embodiments, the XR device interface 1209 and the network adaptor 1210 are a single adaptor suitable for performing the tasks of both network adaptor 1210 and XR device interface 1209.

The CPU 1201 reads various programs (also sometimes referred to herein as instructions) from the ROM and/or the storage unit 1205 and develops the programs in the RAM, so as to execute the various programs. Suitable instructions are stored in storage unit 1205 and/or the ROM and executed by the CPU 1201 to cause the computer 1200 to perform the method 1100.

With reference now to FIG. 11, the computer 1200 receives image frames (e.g., the second image frames) of the real object acquired by the XR device (S1102). The images were acquired when the flag data indicated that the XR object displayed on the XR device was consistent in pose with the real object.

At S1104, the computer 1200 extracts feature data of the real object from the second image frames. The feature data includes the tracked pose of the real object in the respective second image frames. The feature data may include any suitable feature data, such as surface texture information about the object, surface color, etc. Any suitable method for extracting feature data may be used.

The computer then incorporates the extracted feature data into the original training data to create updated training data (S1006). The updated training data is stored in the training data storage portion 1208. In some embodiments, the updated training data replaces the original training data in the training data storage portion 1208. In other embodiments, both sets of training data are kept. In some embodiments, the computer 1200 outputs the updated training data to the HMD 100, either in addition to storing it in the training data storage portion 1208 or instead of storing it in the training data storage portion 1208. The HMD 100 may then use the updated training data to replace the original training data.

In an example embodiment, the updated training data is generated by an appearance template and/or a shape template for each of the second image frames. In some embodiments, the original training data includes one or more shape templates, and the updated training data includes one or more shape templates and one or more appearance templates. The appearance template includes one or more features such as color, surface images or text, corners, and the like. The appearance template may include, for example, coordinate values of the locations of features of the object in the second image frame and their characterization, the coordinates of locations on the 3D model that correspond to those 2D locations, and the 3D model in the pose for which the 2D image was generated. The pose of the 3D model is known for each second image frame, because the HMD 100 was tracking the pose of the real object at the time that the second image frames were acquired, and the tracked pose of the real object at the time of the acquisition of a particular second image frame is associated with that second image frame. The shape template describes the shape of the object in two dimensions without the surface features that are included in the appearance template. The shape template may include, for example, coordinate values of points (2D contour points) included in a contour line (hereinafter, also simply referred to as a "contour") representing an exterior of the object in the 2D synthetic image, the points on the 3D model that correspond to the 2D contour points, and the 3D model in the pose for which the 2D image was generated. In some embodiments, separate shape and appearance templates are created for each second image frame. In other embodiments, data for multiple second image frames may be stored in a single template.

Figure 13:
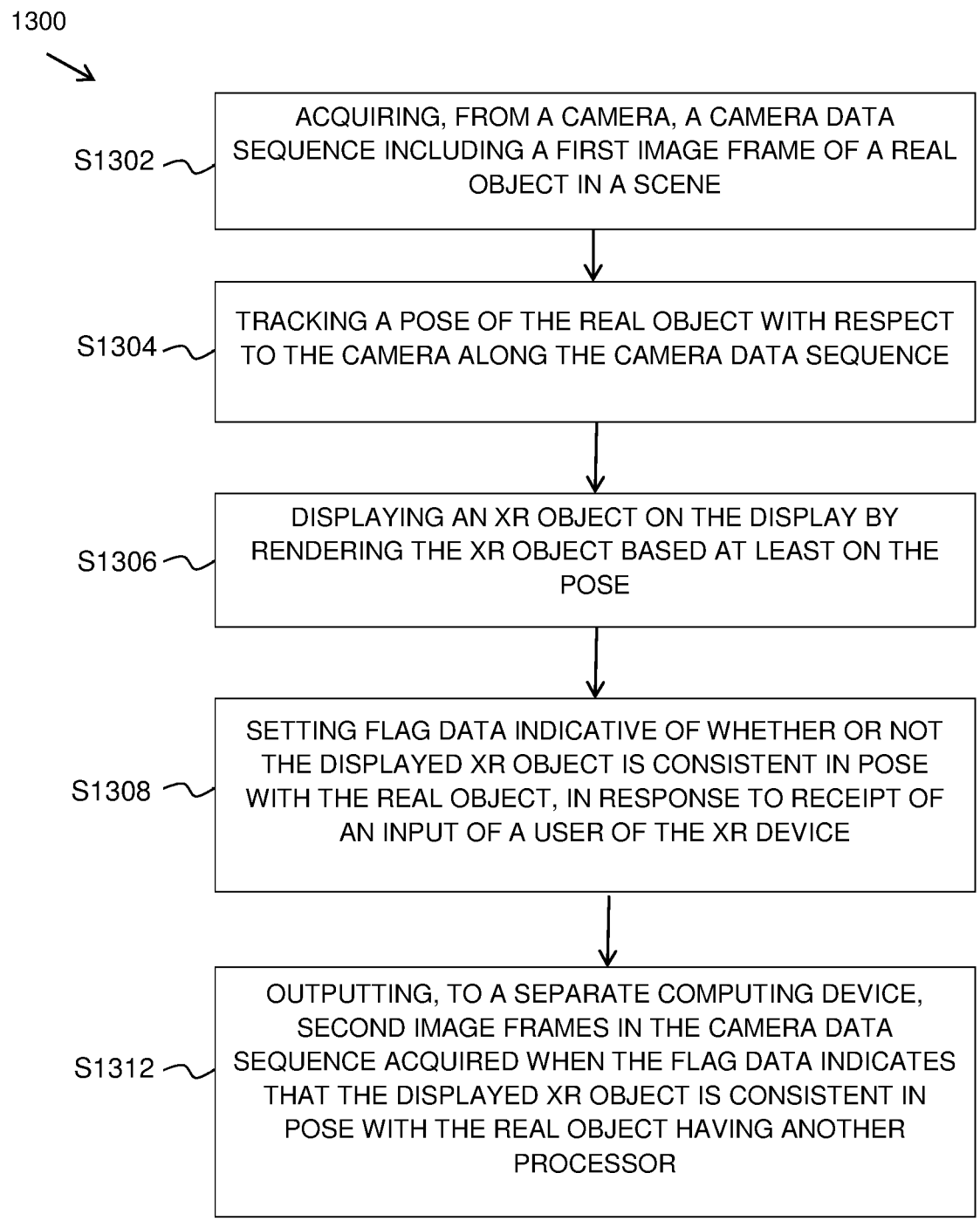
FIG. 13 is a flow diagram of another example embodiment of a method of updating training data for an extended reality device.

FIG. 13 is a flow diagram of an example embodiment of a method 1300 for one or more processors to implement in an XR device. In this embodiment, the XR device is communicatively coupled to a separate computing device. The method 1300 will be described with respect to the HMD 100 and its components. However, the method 1300 may be used with any suitable device for XR, for example, a mobile phone, a computer connected to a camera, a tablet computer, and the like.

The method 1300 includes acquiring, from the camera 60, a camera data sequence including a first image frame of a real object in a scene (S1302). The processor 140 of the HMD 100 then tracks a pose of the real object with respect to the camera along the camera data sequence (S1304). The pose is derived based at least on the first image frame and original training data stored in memory of the HMD 100 (e.g., in RAM 122). The original training data is generated from at least one of (i) a synthetic image of a 3D model rendered from a predetermined view and (ii) a camera image of a reference real object captured from the view. The 3D model and the reference real object correspond to the real object. The pose may be estimated, for example, using the process described above based on template data in the original training data corresponding to the object at one or more known poses. In other embodiments any other suitable pose estimation process may be used. In some embodiments, the original training data may be generated from only one of the synthetic image or the camera image. Moreover, in some embodiments, original training data includes only shape-based training data. That is, the original training data is not based on feature data, such as surface texture, color, lighting, or the like.

At S1306, the processor 140 displays an XR object on the display section 20 by rendering the XR object based at least on the pose. Thus, for example, the XR object may be a display overlying the object at a particular portion of the object, which can be identified because of the pose, an XR object whose content relates to the pose (e.g., a message that "the object is upside down"), or any other XR object based on the pose.

The processor 140 sets flag data, in a memory area of the memory of HMD 100, indicative of whether or not the displayed XR object is consistent in pose with the real object (S1308). The flag data may be set, for example, in RAM 122 or another memory device of HMD 100. The memory area may be a particular memory device (e.g., RAM 122, a specific flash-memory device, a specific hard disk drive, etc.) or may be an area within a particular memory device (e.g., a range of memory addresses).

The flag data is set response to receipt of an input of a user of the XR device. The user input indicates whether or not the displayed XR object is consistent in pose with the real object. Thus, for example, if the XR object is flashing lights intended to overlie the light bar on a real-world toy car, if the lights are displayed at the proper location in the car and properly aligned with the light bar, the user would input an indication that the displayed XR object is consistent in pose with the real object. The user input may be an input via a user interface of the HMD 100, or by any other suitable method of user input.

If, instead, the XR object is not consistent with the pose of the real object (such as if the flashing lights in the example are displayed on the tires of the car or perpendicular to the light bar), the user input would indicate that the displayed XR object is not consistent in pose with the real object. The user input that the displayed XR object is not consistent in pose with the real object may be an active input (for example, by selecting that the displayed XR object is not consistent in pose with the real object on a user interface), or a passive input (such as by simply not inputting that the displayed XR object is consistent in pose with the real object for a predetermined length of time). Thus, the absence of an input that indicates that the displayed XR object is consistent in pose with the real object is still an input indicating whether or not the displayed XR object is consistent in pose with the real object.

The second image frames are output to a separate computing device (such as the computer 1200 in FIG. 12.) having another processor at S1312. The second images may be output substantially real-time. Thus, the HMD 100 is communicatively coupled to the separate computing device when the second images are acquired. The communicative coupling may be a wired or wireless connection using any suitable communication protocol. The separate computing device uses the second images to update the training data. The method performed by the separate computing device is described above with reference to FIG. 11.

Thus, when the user inputs an indication that the displayed XR object is consistent in pose with the real object, and the flag data is appropriately set, the subsequent images in the camera data sequence (which are also used for tracking the object as the pose changes) are output to the separate computing device. In an example embodiment, all image frames (the second image frames) for a predetermined length of time after the flag is set to indicate that the displayed XR object is consistent in pose with the real object are output to the separate computing device.

In other embodiments, rather than outputting all image frames for a predetermined length of time, a limited group of image frames in the camera data sequence is output as the second image frames. The limited group may be for example, image frames selected at a predetermined interval (such as one frame every second, every tenth frame, etc.), or image frames based on content. Image frames may be selected as second images based on content, for example, based on whether they are acquired from a different view (or show a different pose) of the object than other second image frames. Thus, for example, if a user and the object remain perfectly stationary for a length of time, only one second image would be stored. The difference in pose may be any difference (no matter how slight), or may be a difference that exceeds some threshold difference (for example, a pose that differs by 1 degree of viewpoint in any direction, 5 degrees of viewpoint in any direction, 10 degrees of viewpoint in any direction, etc.). Additionally, or alternatively, the content based limiting may be based on the quality of the images. Thus, for example, even if the pose is the same in multiple image frames, any image frames in which the object is blurry, overexposed, underexposed, etc., may not be output. Further, in some embodiments, the limited group may be selected based on detected movement of the user and the HMD 100. Thus, when the HMD 100 is not moving, only one image may be output as a second image. When the HMD 100 detects movement, additional image frames are output as second images. Of course the above options for which images to output as second images may be combined in various combinations. For example, the processor could output as second images only the best (not overexposed or blurry) image frames acquired during a 1 second window every 5 seconds. Any other suitable combination or other technique for determining which (including all) image frames to output as second image frames may be used.

In some embodiments, the method includes receiving, after outputting the second image frames, the updated training data to replace the original training data. The HMD 100 then uses the updated training data for subsequent object detection and tracking. In some embodiments, the method 1300 is performed repeatedly to further update and refine the training data. Thus, updated training data may be considered original training data for a subsequent performance of the method 1300.

Figure 14:
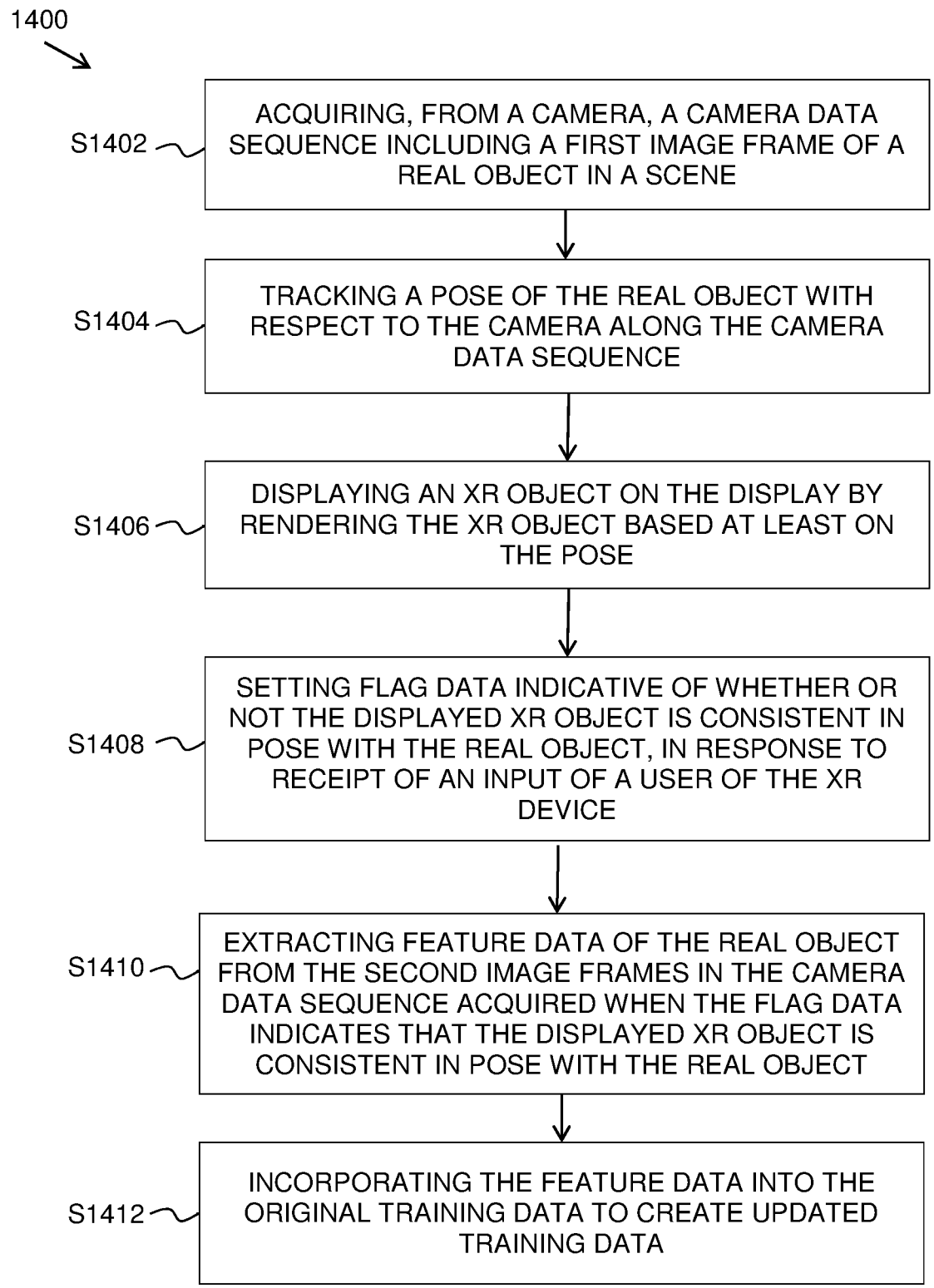
FIG. 14 is a flow diagram of another example embodiment of a method of updating training data for an extended reality device.

FIG. 14 is a flow diagram of an example embodiment of a method 1400 for one or more processors to implement in an XR device. The method 1400 will be described with respect to the HMD 100 and its components. However, the method 1400 may be used with any suitable device for XR, for example, a mobile phone, a computer connected to a camera, a tablet computer, and the like.

The method 1400 includes acquiring, from the camera 60, a camera data sequence including a first image frame of a real object in a scene (S1402). The processor 140 of the HMD 100 then tracks a pose of the real object with respect to the camera along the camera data sequence (S1404). The pose is derived based at least on the first image frame and original training data stored in memory of the HMD 100 (e.g., in ROM 121). The original training data is generated from at least one of (i) a synthetic image of a 3D model rendered from a predetermined view and (ii) a camera image of a reference real object captured from the view. The 3D model and the reference real object correspond to the real object. The pose may be estimated, for example, using the process described above based on template data in the original training data corresponding to the object at one or more known poses. In other embodiments any other suitable pose estimation process may be used. In some embodiments, the original training data may be generated from only one of the synthetic image or the camera image. Moreover, in some embodiments, original training data includes only shape-based training data. That is, the original training data is not based on feature data, such as surface texture, color, lighting, or the like.

At S1406, the processor 140 displays an XR object on the display section 20 by rendering the XR object based at least on the pose. Thus, for example, the XR object may be a display overlying the object at a particular portion of the object, which can be identified because of the pose, an XR object whose content relates to the pose (e.g., a message that "the object is upside down"), or any other XR object based on the pose.

The processor 140 sets flag data, in a memory area of the memory of HMD 100, indicative of whether or not the displayed XR object is consistent in pose with the real object (S1408). The flag data may be set, for example, in RAM 122 or another memory device of HMD 100. The memory area may be a particular memory device (e.g., RAM 122, a specific flash-memory device, a specific hard disk drive, etc.) or may be an area within a particular memory device (e.g., a range of memory addresses).

The flag data is set response to receipt of an input of a user of the XR device. The user input indicates whether or not the displayed XR object is consistent in pose with the real object. Thus, for example, if the XR object is flashing lights intended to overlie the light bar on a real-world toy car, if the lights are displayed at the proper location in the car and properly aligned with the light bar, the user would input an indication that the displayed XR object is consistent in pose with the real object. The user input may be an input via a user interface of the HMD 100, or by any other suitable method of user input.

If, instead, the XR object is not consistent with the pose of the real object (such as if the flashing lights in the example are displayed on the tires of the car or perpendicular to the light bar), the user input would indicate that the displayed XR object is not consistent in pose with the real object. The user input that the displayed XR object is not consistent in pose with the real object may be an active input (for example, by selecting that the displayed XR object is not consistent in pose with the real object on a user interface), or a passive input (such as by simply not inputting that the displayed XR object is consistent in pose with the real object for a predetermined length of time). Thus, the absence of an input that indicates that the displayed XR object is consistent in pose with the real object is still an input indicating whether or not the displayed XR object is consistent in pose with the real object.

In this embodiment, when the user inputs an indication that the displayed XR object is consistent in pose with the real object, and the flag data is appropriately set, the subsequent images in the camera data sequence (which are also used for tracking the object as the pose changes) are used by the HMD 100 to update the original training data. In an example embodiment, all image frames (the second image frames) for a predetermined length of time after the flag is set to indicate that the displayed XR object is consistent in pose with the real object are used as the second image frames.

In other embodiments, rather than all image frames for a predetermined length of time, a limited group of image frames in the camera data sequence is selected as the second image frames. The limited group may be for example, image frames selected at a predetermined interval (such as one frame every second, every tenth frame, etc.), or image frames based on content. Image frames may be selected as second images based on content, for example, based on whether they are acquired from a different view (or show a different pose) of the object than other second image frames. Thus, for example, if a user and the object remain perfectly stationary for a length of time, only one second image would be selected. The difference in pose may be any difference (no matter how slight), or may be a difference that exceeds some threshold difference (for example, a pose that differs by 1 degree of viewpoint in any direction, 5 degrees of viewpoint in any direction, 10 degrees of viewpoint in any direction, etc.). Additionally, or alternatively, the content based limiting may be based on the quality of the images. Thus, for example, even if the pose is the same in multiple image frames, any image frames in which the object is blurry, overexposed, underexposed, etc., may not be selected as second images. Further, in some embodiments, the limited group may be selected based on detected movement of the user and the HMD 100. Thus, when the HMD 100 is not moving, only one image may be selected as a second image. When the HMD 100 detects movement, additional image frames are selected as second images. Of course the above options for which images to select as second images may be combined in various combinations. For example, the processor could select as second images only the best (not overexposed or blurry) image frames acquired during a 1 second window every 5 seconds. Any other suitable combination or other technique for determining which (including all) image frames to selected as second image frames may be used.

At S1410, the processor 140 extracts feature data of the real object from the second image frames. The feature data includes the tracked pose of the real object in the respective second image frames. The feature data may include any suitable feature data, such as surface texture information about the object, surface color, etc. Any suitable method for extracting feature data may be used.

The processor 140 then incorporates the extracted feature data into the original training data to create updated training data (S1412). In the example embodiment, the updated training data replaces the original training data. In other embodiments, both sets of training data are kept. The HMD 100 may then use the updated training data to replace the original training data. The HMD 100 uses the updated training data for subsequent object detection and tracking. In some embodiments, the method 1400 is performed repeatedly to further update and refine the training data. Thus, updated training data may be considered original training data for a subsequent performance of the method 1400.

In an example embodiment, the updated training data is generated by an appearance template and/or a shape template for each of the second image frames. In some embodiments, the original training data includes one or more shape templates, and the updated training data includes one or more shape templates and one or more appearance templates. The appearance template includes one or more features such as color, surface images or text, corners, and the like. The appearance template may include, for example, coordinate values of the locations of features of the object in the second image frame and their characterization, the coordinates of locations on the 3D model that correspond to those 2D locations, and the 3D model in the pose for which the 2D image was generated. The pose of the 3D model is known for each second image frame, because the HMD 100 was tracking the pose of the real object at the time that the second image frames were acquired, and the tracked pose of the real object at the time of the acquisition of a particular second image frame is associated with that second image frame. The shape template describes the shape of the object in two dimensions without the surface features that are included in the appearance template. The shape template may include, for example, coordinate values of points (2D contour points) included in a contour line (hereinafter, also simply referred to as a "contour") representing an exterior of the object in the 2D synthetic image, the points on the 3D model that correspond to the 2D contour points, and the 3D model in the pose for which the 2D image was generated. In some embodiments, separate shape and appearance templates are created for each second image frame. In other embodiments, data for multiple second image frames may be stored in a single template.

Some embodiments provide a non-transitory storage medium (e.g. ROM 121, RAM 122) containing program instructions that, when executed by a computer processor (e.g. CPU 140 or processing section 167), perform the methods described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for one or more processors to implement in an extended reality (XR) device including a camera, the one or more processors, at least one memory, and a display, the method comprising:
    acquiring, from the camera, a camera data sequence including a first image frame of a real object in a scene;
    tracking a pose of the real object with respect to the camera along the camera data sequence, the pose being derived based at least on the first image frame and original training data generated from at least one of (i) a synthetic image of a 3D model rendered from a predetermined view and (ii) a camera image of a reference real object captured from the view, where the 3D model and the reference real object correspond to the real object;
    displaying an XR object on the display by rendering the XR object based at least on the pose;
    setting flag data, in a memory area of the at least one memory, indicative of whether or not the displayed XR object is consistent in pose with the real object, in response to receipt of an input of a user of the XR device;
    storing, in another memory area of the at least one memory, second image frames in the camera data sequence acquired when the flag data indicates that the displayed XR object is consistent in pose with the real object; and
    outputting the stored second image frames to a separate computing device having another processor.

2. The method according to claim 1, further comprising receiving, after outputting the stored second image frames, another training data to replace or update the original training data, the another training data being based at least in part on the output second image frames.

3. The method according to claim 1, further comprising receiving an input from the user of the XR device through a user interface indicating that the displayed XR object is consistent in pose with the real object.

4. The method according to claim 1, further comprising not storing the second image frames in the camera data sequence acquired when the flag data indicates that the displayed XR object is not consistent in pose with the real object.

5. The method according to claim 1, wherein tracking a pose of the real object with respect to the camera along the camera data sequence comprises deriving the pose based on the first image frame and training data only generated from a synthetic image of the 3D model rendered from the predetermined view.

6. The method according to claim 1, wherein the original training data includes only shape-based training data.

7. A method for one or more processors to implement in a computing device including the one or more processors and a memory storing original training data for tracking a real object using an extended reality (XR) device, the method comprising:
receive image frames of the real object acquired by the XR device, the images being acquired when flag data indicated that an XR object displayed on the XR device was consistent in pose with the real object;
extracting feature data of the real object from the image frames, the feature data including the tracked pose of the real object in the respective image frames; and
generating another training data to replace or update the original training data, the another training data based at least in part on the extracted feature data.

8. The method according to claim 7, further comprising outputting the another training data to the XR device.

9. The method according to claim 7, wherein the original training data included only shape-based training data.

10. A method for one or more processors to implement in an extended reality (XR) device including a camera, the one or more processors, at least one memory, and a display, the method comprising:
acquiring, from the camera, a camera data sequence including a first image frame of a real object in a scene;
tracking a pose of the real object with respect to the camera along the camera data sequence, the pose being derived based at least on the first image frame and original training data generated from at least one of (i) a synthetic image of a 3D model rendered from a predetermined view and (ii) a camera image of a reference real object captured from the view, where the 3D model and the reference real object correspond to the real object;
displaying an XR object on the display by rendering the XR object based at least on the pose;
setting flag data, in a memory area of the at least one memory, indicative of whether or not the displayed XR object is consistent in pose with the real object, in response to receipt of an input of a user of the XR device;
outputting, to a separate computing device having another processor, second image frames in the camera data sequence acquired when the flag data indicates that the displayed XR object is consistent in pose with the real object.

11. The method according to claim 10, further comprising receiving, after outputting the second image frames, another training data to replace or update the original training data, the updated training data being based at least in part on the output second image frames.

12. The method according to claim 10, further comprising receiving an input from the user of the XR device through a user interface indicating that displayed XR object is consistent in pose with the real object.

13. The method according to claim 10, further comprising not outputting the second image frames in the camera data sequence acquired when the flag data indicates that the displayed XR object is not consistent in pose with the real object.

14. The method according to claim 10, wherein tracking a pose of the real object with respect to the camera along the camera data sequence comprises deriving the pose based on the first image frame and training data only generated from a synthetic image of the 3D model rendered from a predetermined view.

15. The method according to claim 10, wherein the original training data includes only shape-based training data.

16. A method for one or more processors to implement in an extended reality (XR) device including a camera, the one or more processors, at least one memory, and a display, the method comprising:
acquiring, from the camera, a camera data sequence including a first image frame of a real object in a scene;
tracking a pose of the real object with respect to the camera along the camera data sequence, the pose being derived based at least on the first image frame and original training data generated from at least one of (i) a synthetic image of a 3D model rendered from a predetermined view and (ii) a camera image of a reference real object captured from the view, where the 3D model and the reference real object correspond to the real object;
displaying an XR object on the display by rendering the XR object based at least on the pose;
setting flag data, in a memory area of the at least one memory, indicative of whether or not the displayed XR object is consistent in pose with the real object, in response to receipt of an input of a user of the XR device;
extracting feature data of the real object from second image frames in the camera data sequence acquired when the flag data indicates that the displayed XR object is consistent in pose with the real object, the feature data including the tracked pose of the real object in the respective second image frames; and
generating another training data to replace or update the original training data, the another training data based at least in part on the extracted feature data.

17. The method according to claim 16, further comprising receiving an input from the user of the XR device through a user interface indicating that displayed XR object is consistent in pose with the real object.

18. The method according to claim 16, further comprising not extracting feature data of the real object from the second image frames in the camera data sequence when the flag data indicates that the displayed XR object is not consistent in pose with the real object.

19. The method according to claim 16, wherein tracking a pose of the real object with respect to the camera along the camera data sequence comprises deriving the pose based on the first image frame and training data only generated from a synthetic image of the 3D model rendered from a predetermined view.

20. The method according to claim 16, wherein the original training data includes only shape-based training data.

\* \* \* \* \*